W. B. SMITH.
Chuck for Holding Excentrics while being Turned.
No. 167,277. Patented Aug. 31, 1875.

Attest:
Inventor:

W. B. SMITH.
Chuck for Holding Excentrics while being Turned.
No. 167,277. Patented Aug. 31, 1875.

Attest:
I. W. Hernandez
A. H. Leland Rivers

Inventor:
W. Bell Smith

United States Patent Office.

W. BELL SMITH, OF CHARLESTON, SOUTH CAROLINA.

IMPROVEMENT IN CHUCKS FOR HOLDING ECCENTRICS WHILE BEING TURNED.

Specification forming part of Letters Patent No. 167,277, dated August 31, 1875; application filed July 17, 1875.

*To all whom it may concern:*

Be it known that I, W. BELL SMITH, of Charleston, in the county of Charleston and the State of South Carolina, have invented a new and useful improvement to be attached to the mandrel of a lathe for facilitating the turning off eccentrics on the outside; and I do declare that the following is a full, clear, and exact description of the construction and operation of the same, reference being had to the annexed drawings, making a part of this specification, in which—

Figure 1:
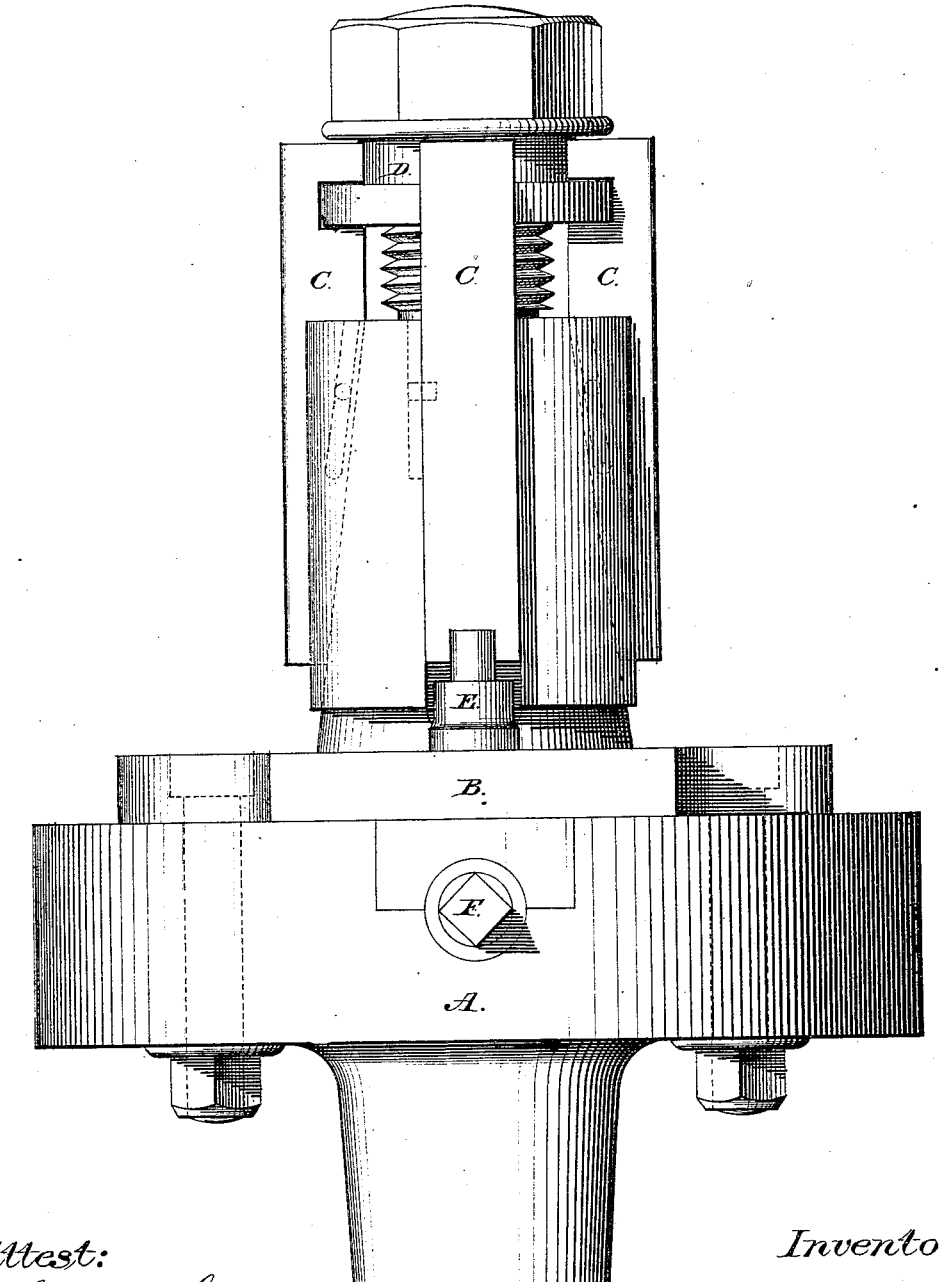
Figure 2:
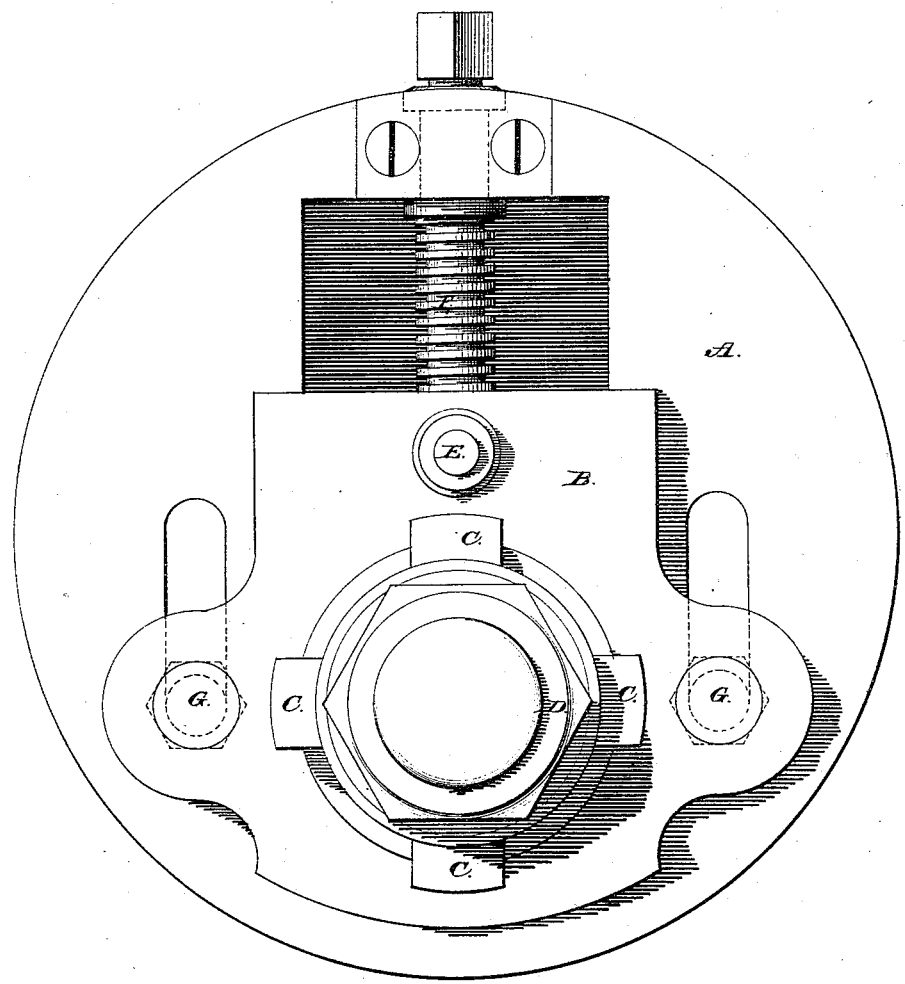

Figure 1 represents side elevation. Fig. 2 represents plan or top view.

The invention relates to an improvement of a chuck to be attached to the mandrel of a lathe, for the purpose of facilitating the setting of eccentrics preparatory to turning them off on the outside.

A represents a plate having a slot passing directly through the center, in which the projection upon the flange of the mandrel B fits easily and accurately. Through the mandrel are four inclined grooves or slots, in which easily slide the steel keys C C C C. Smaller grooves are shown in the sides of these slots, holding pins secured to the keys only for the purpose of preventing their dropping out. D represents a flanged nut which screws on the threaded end of the mandrel B, and embraced by the keys, for carrying them all together through these slots, thereby expanding and contracting, as may be required, for the different diameters of bore and tightening up the work. E is a stud, secured to the flange of mandrel in the center line, which enters a hole drilled in the eccentric in line of throw. The screw F is for carrying the mandrel and eccentric out to the throw or stroke desired. The bolts G G secure the mandrel to the plate.

The operation of this eccentric chuck is as follows: The eccentrics to be turned are first bored out; a line is then drawn directly through the center and larger part of it, a hole then drilled in this line, and the same distance as from center of mandrel B to stud E. The chuck is then screwed upon the mandrel of the lathe, the eccentric placed upon the mandrel B, the drilled hole fitting on the stud E. The nut D is then screwed up, the keys C C C C moving all together until they tighten upon the eccentric. The screw F then carries the mandrel and eccentric over to the proper throw or stroke required, all of which is done very rapidly and correctly.

Having described my invention, I claim as new and desire to secure by Letters Patent—

The plate A, in combination with the movable expanding mandrel B and screw F, all constructed and operating substantially as and for the purpose described.

W. BELL SMITH.

Witnesses:
   I. W. HERNANDEZ,
   A. W. LELAND RIVERS.